United States Patent [19]

Nielsen et al.

[11] Patent Number: 6,098,102
[45] Date of Patent: Aug. 1, 2000

[54] SELECTIVE DOWNLOADING OF FILE TYPES CONTAINED IN HYPERTEXT DOCUMENTS TRANSMITTED IN A COMPUTER CONTROLLED NETWORK

[75] Inventors: Christopher Robbins Nielsen; Rick Lee Poston; Stephen Gray Stair; I-Hsing Tsao, all of Austin, Tex.

[73] Assignee: International Business Machines Corporation, Armonk, N.Y.

[21] Appl. No.: 08/974,411

[22] Filed: Nov. 19, 1997

[51] Int. Cl.[7] .................................................. G06F 15/16
[52] U.S. Cl. .................... 709/229; 709/200; 709/206; 709/217; 709/228; 709/1; 709/10
[58] Field of Search .................................. 709/202–203, 709/205–206, 217–219, 227–229, 246; 707/1, 2, 5, 9–10, 104, 201

[56] References Cited

U.S. PATENT DOCUMENTS

| | | | |
|---|---|---|---|
| 4,999,766 | 3/1991 | Peters et al. | 707/10 |
| 5,572,643 | 11/1996 | Judson | 709/218 |
| 5,678,041 | 10/1997 | Baker et al. | 709/229 |
| 5,710,883 | 1/1998 | Hong et al. | 709/229 |
| 5,737,395 | 4/1998 | Irribarren | 709/206 |
| 5,737,533 | 4/1998 | De Hond | 709/219 |
| 5,835,712 | 11/1998 | DuFresne | 709/203 |
| 5,987,510 | 11/1999 | Imai et al. | 709/219 |

*Primary Examiner*—Ahmad F. Matar
*Assistant Examiner*—Bharat Barot
*Attorney, Agent, or Firm*—Jerry B. Kraft; Mark E. McBurney

[57] ABSTRACT

A data processor controlled user interactive display system for displaying hypertext documents, each including a sequence of display screen paces received over a communications network such as the World Wide Web with each display page including a sequence of accompanying displayable image and media files in which means are provided for markedly reducing downloading time by providing user interactive means for preselecting document file types not to be transmitted to a receiving display station, user interactive means for preselecting document file types to be transmitted to said receiving display station and means for permitting the transmission of only the file types preselected to be transmitted.

14 Claims, 3 Drawing Sheets

SELECTIVE DOWNLOADING OF FILE TYPES CONTAINED IN HYPERTEXT DOCUMENTS TRANSMITTED IN A COMPUTER CONTROLLED NETWORK

TECHNICAL FIELD

The present invention relates to computer managed communication networks and particularly to ease of use of interactive computer controlled display interfaces to networks for substantially reducing the time and resources required to download hypertext documents into receiving network display stations.

BACKGROUND OF THE INVENTION

The 1990's decade has been marked by a societal technological revolution driven by the convergence of the data processing industry with the consumer electronics industry. Like all such revolutions, it unleashed a significant ripple effect of technological waves. The effect has in turn driven technologies which have been known and available but relatively quiescent over the years. A major one of these technologies is the internet-related distribution of documents, media and programs. The convergence of the electronic entertainment and consumer industries with data processing exponentially accelerated the demand for wide ranging communications distribution channels, and the World Wide Web or internet which had quietly existed for over a generation as a loose academic and government data distribution facility reached "critical mass" and commenced a period of phenomenal expansion. With this expansion, businesses and consumers have direct access to all matter of documents, media and computer programs.

In addition, Hypertext Markup Language (HTML), which had been the documentation language of the internet World Wide Web for years offered direct links between pages and other documentation on the Web and a variety of related data sources which were at first text and then evolved into media, i.e. "hypermedia". This even further exploded the use of the internet or World Wide Web. It was now possible for the Web browser or wanderer to spend literally hours going through document after document and accompanying media events in often less than productive excursions through the Web. These excursions often strained the users' time and resources. In order for the internet to mature from its great expectations to solid commercial fruition, it will be necessary for the internet to greatly reduce its drain on time and related resources. A significant source of this drain is in the Web page, the basic document page of the Web.

In the case of Web pages, we do not have the situation of a relatively small group of professional designers working out the human factors; rather in the era of the Web, anyone and everyone can design a Web page. As a result, pages are frequently designed by developers without imaging or graphic skills or worse yet, they include media such as video or audio. The value of this media is often far outweighed by their drain on the receiver's resources and time. Media and some image files require relatively great amounts of time to download at the receiving station. In addition, there appears to be an increasing amount of advertising on the Web wherein the seeker of information at times has to be subject to "commercials" often in the time and resource taxing media formats.

The present invention provides a solution to this downloading problem by giving the user at the receiving workstation the power to drastically limit the incoming Web page information which would be time and resource consuming.

SUMMARY OF THE INVENTION

The present invention relates to a computer controlled display system for displaying documents, and particularly for displaying Web pages and related documentation on receiving display workstations in a computer managed communication network. Users access these Web pages via a plurality of such data processor controlled interactive display stations receiving documents transmitted to said display stations from locations remote from said stations. Such documents include a sequence of at least one display screen page with associated displayable image and media files. The user at a receiving display station is given the power to prevent the receipt of unwanted download time consuming files by user interactive means for preselecting document file types not to be transmitted to the receiving display station and user interactive means for preselecting document file types to be transmitted to said receiving display station. In this manner, the user at the receiving display station should be able to initially anticipate and thus block the receipt of undesirable file types accompanying document pages.

The invention operates most effectively with Web pages in their conventional hypertext mode usually in the HTML language format. File types are identified by the conventional extensions attached to the file names. Best results are achieved by providing to the user at the receiving display station a menu, usually in his Web or internet browser, listing conventional file extensions from which he may select the file types to be blocked from transmission. These preselections are communicated with the network server through which the display station usually communicates with the network, and the network server provides the means for blocking and transmitting the preselected file types. At some point, usually after the transmission of the document along with the preselected file types, the server is able to transmit to the receiving station a list identifying the files which were blocked from transmission as a result of the user's preselection. The user then has an opportunity in light of what he has already received to make a determination as to whether he has blocked any files which could be of value to him. Should he find that he does need other files, there are interactive means at said receiving station for selecting additional file types to be transmitted to said receiving station in response to the receiving of said list of files.

DETAILED DESCRIPTION OF THE PREFERRED EMBODIMENT

Before going into the details of specific embodiments, it will be helpful to understand from a more general perspective the various elements and methods which may be related to the present invention. Since a major aspect of the present invention is directed to documents such as Web pages transmitted over networks, an understanding of networks and their operating principles would be helpful. We will not go into great detail in describing the networks to which the present invention is applicable. Reference has also been made to the applicability of the present invention to a global network such as the internet. For details on internet nodes, objects and links, reference is made to the text, *Mastering the Internet*, G. H. Cady et al., published by Sybex Inc. Alameda, Calif, 1996.

Any data communication system which interconnects or links computer controlled systems with various sites defines a communications network. A network may be as simple as two linked computers or it may be any combination of LANS (Local Area Networks) or WANS (Wide Area Networks). Of course, the internet or World Wide Web is a global network of a heterogeneous mix of computer technologies and operating systems. Higher level objects are linked to the lower level objects in the hierarchy through a variety of network server computers. These network servers are the key to network distribution such as the distribution of Web pages and related documentation. The HTML language is described in detail in the above "Just Java" text and particularly at Chapter 7, pp. 249–268, dealing with the handling of Web pages with embedded hotspot activated linkages and also in the text, "Mastering the Internet", Cady and McGregor, published by Sybex, San Francisco, 1996 and particularly pp. 637–642 on HTML in the formation of Web pages. In addition, significant aspects of this invention will involve Web browsers. A general and comprehensive description of browsers may be found in the above mentioned Cady et al. text at pp. 291–313.

Figure 1:
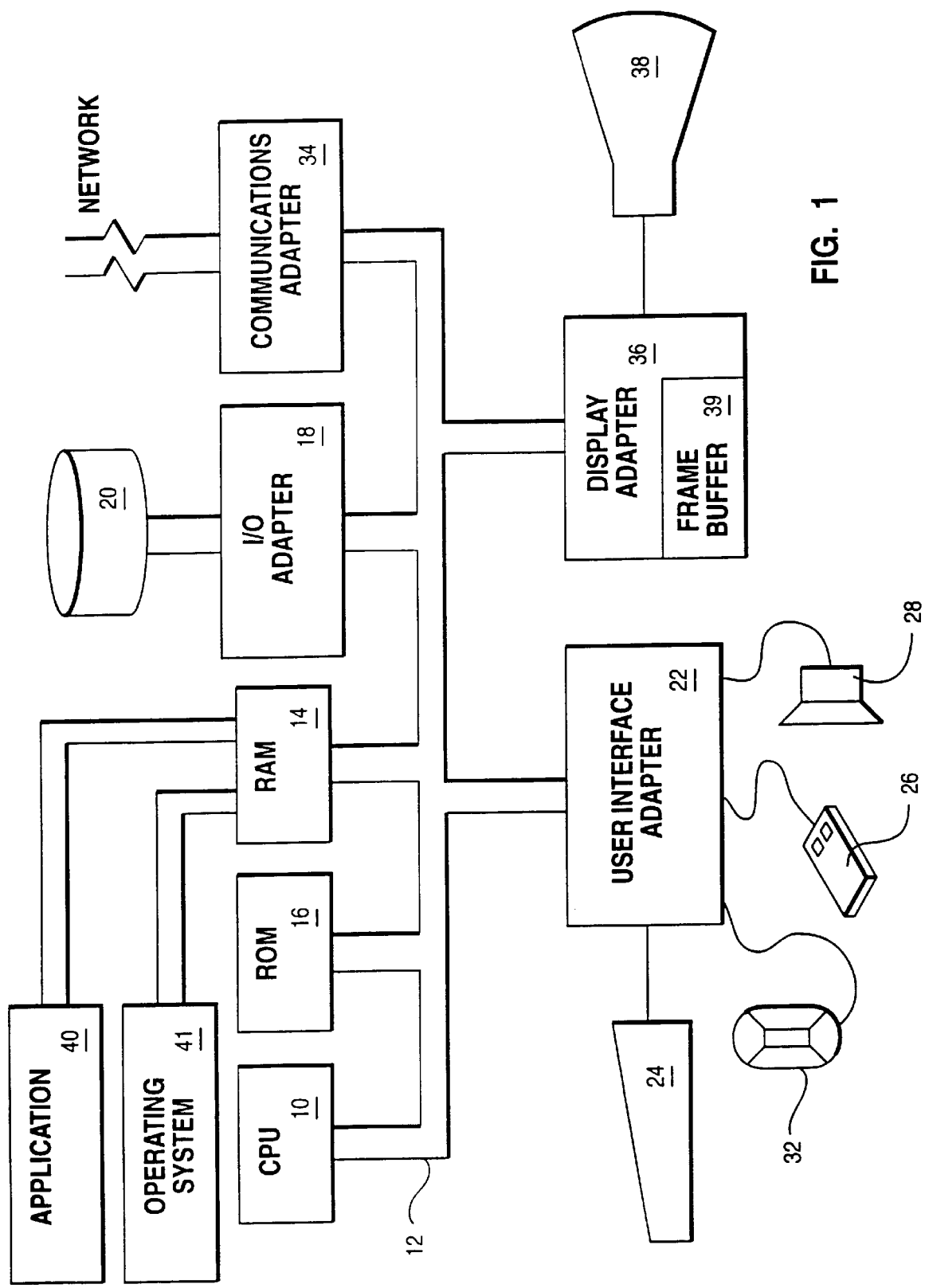
FIG. 1 is a block diagram of a data processing system including a central processing unit and network connections via a communications adapter which is capable of implementing a user interactive workstation on which the received data may be converted into a Web page in accordance with the present invention.

Referring to FIG. 1, a typical data processing system is shown which may be used in conjunction with HTML in implementing the present invention on the receiving interactive workstation. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as the OS/2 operating system available from International Business Machines Corporation (OS/2 is a trademark of International Business Machines Corporation) or the Windows95 system (a trademark of and available from Microsoft Corporation). Any conventional network browser system involving HTML language with embedded hotspots or links forms part of application 40, runs in conjunction with operating system 41 and provides output calls to the operating system 41 which implements the various functions to be performed by the HTML application 40. Also included in the application software 40 will be the applications of this invention for controlling the transmission of file types to be subsequently described in detail. The browser program operates in combination with the program of the present invention or the program of this invention could desirably be incorporated into the browser program.

The browser program, in combination with the operating system, provides the basic receiving workstation on which the Web pages are received and on which the program of the present invention may be implemented to limit the receipt of downloading time consuming unwanted file types.

A read only memory (ROM) L6 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and the browser, HTML and dynamic hotspot zone expansion applications 40 are loaded into RAM 14, which is the computer system's main memory. I/O adapter 18 may be a small computer system interface (SCSI) adapter that communicates with the disk storage device 20, i.e. a hard drive. Communications adapter 34 interconnects bus 12 with an outside network enabling the workstation to communicate with Web servers to receive document pages over a local area network (LAN) or wide area network (WAN) which includes, of course, the internet or World Wide Web. I/O devices are also connected to system bus 12 via user interface adapter 22 and display adapter 36. Keyboard 24, trackball 32, audio output 28 and mouse 26 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting data and other information to the system through the trackball 32 or mouse 26 to make his preselections of file types to be and not to be transmitted from the server and for receiving the transmitted file types and other output information from the system via display 38.

Figure 2:
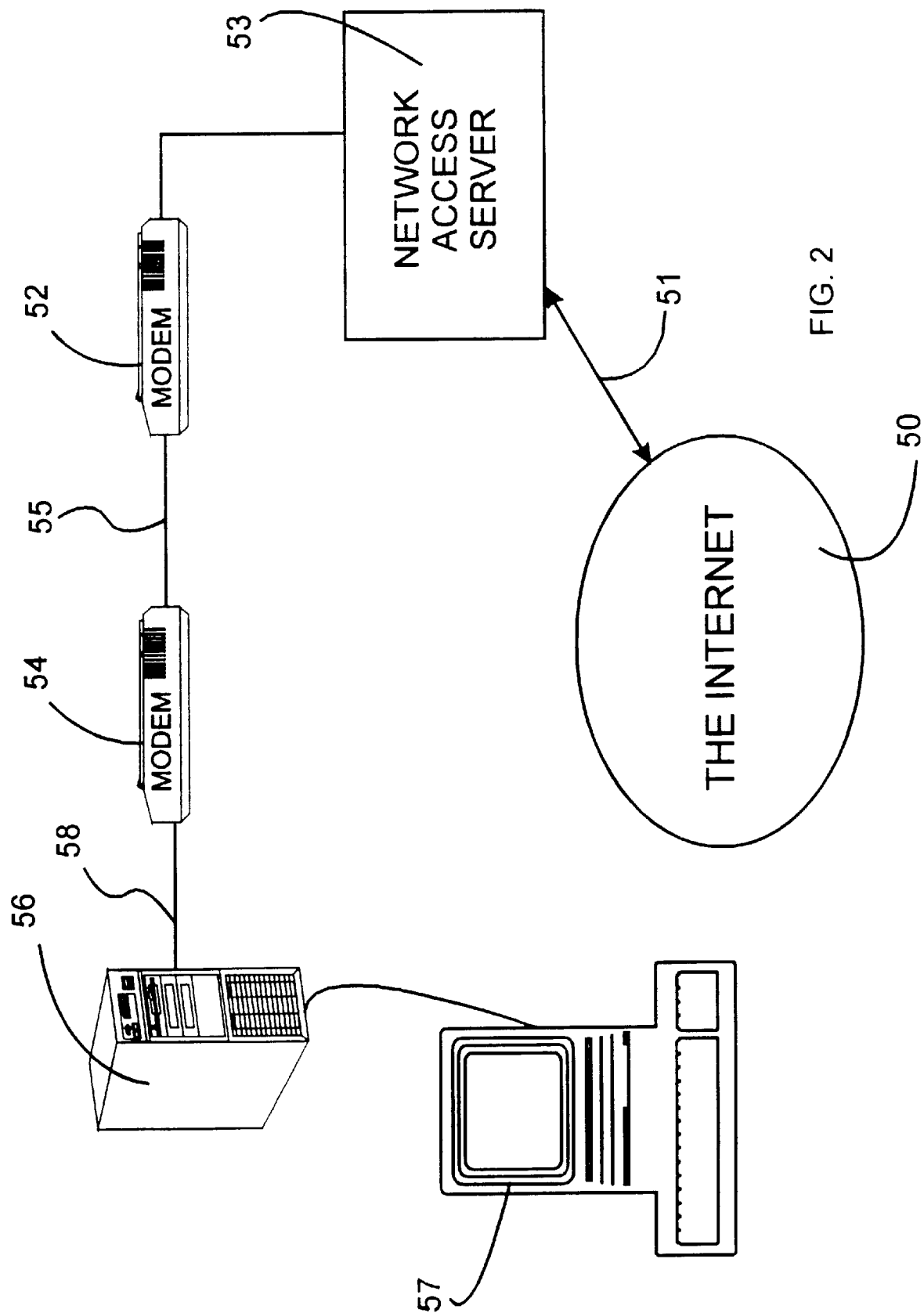
FIG. 2 is a generalized diagrammatic view of an internet portion upon which the present invention may implemented.

A generalized diagram of a portion of an internet which the computer 56 controlled display terminal 57 used for Web page or other document display of the present invention is connected as shown in FIG. 2. Computer 56 and display terminal 57 are the computer system shown in FIG. 1 and connection 58 (FIG. 2) is the network connection shown in FIG. 1. Reference may be made to the above-mentioned text, *Mastering the Internet*, Cady et al., particularly at pp. 136–147, for typical connections between local display workstations to the internet via network servers any of which may be used to implement the system on which this invention is used. The system embodiment of FIG. 2 is one of these known as a host-dial connection. Such host-dial connections have been in use for over 30 years through network access servers 53 which are linked 51 to the Internet 50. The servers 53 are maintained by a service provider to the client's display terminal 57. The host's server 53 is accessed by the client terminal 57 through a normal dial-up telephone linkage 58 via modem 54, telephone line 55 and modem 52. The HTML files representative of the Web pages are downloaded to display terminal 57 through controlling server 53 and computer 56 via the telephone line linkages from server 53 which may have accessed them from the internet 50 via linkage 51. In accordance with the present invention, the user at display terminal 57 is prompted by the program on computer 56 to make his preselections as to which file types to transmit or not to transmit. These choices are conveyed to the server 53 usually via the browser program and in turn carried out by the server 53.

Before proceeding with specific software embodiments, some additional background information should be considered. Because of the ease and availability of Web browsers, an almost unimaginable number and variety of pages and topics are available at low cost to tens of millions of users. Unlike other data base access systems, everyone on the Web has the ability to incorporate additional information. Also, as has been set forth earlier, in the era of the Web, anyone and everyone can design a Web page. As a result, pages are frequently designed by developers without imaging or graphic skills or worse yet, they include media such as video or audio, the value of which is often far outweighed by their drain on the receiver's resources and time. Media and some image files require relatively great amounts of time to download at the receiving station. In addition, there appears to be an increasing amount of advertising on the Web wherein the seeker of information at times has to be subject to "commercials", often in the time and resource taxing media formats. Thus, the key to our invention is to give to the user, the computer interactive power to try to eliminate the downloading of unneeded ponderous Web page files by recognizing the file types which would be expected to include such ponderous files and to prevent such file types from being transmitted to the user. In this respect, let us consider some conventional file type identifiers. On the internet or World Wide Web, files transmitted are identified by file extensions. For example: dolphins.bmp, dolphins.mov, dolphins.jpg or dolphins.gif where the extensions define the file types. The above mentioned Cady et al. text, at pp. 300–313, discusses the various file extensions handled by Web browsers and the types and nature of the files they designate.

The present invention is preferably implemented on the net browsers in combination with standard browser functions. A graphical user interface is provided within the browser which would prompt the user to indicate the file types which the browser has permission to download from the server. File types are identified by their extensions which are text strings after the file name indicating file type. For example, .gif after the file name indicates that the file is written in the .gif format. When a browser loads an HTML page, the page may often contain instructions to automatically download and display or otherwise utilize additional files. If the file has an extension which the user has preselected to be automatically downloaded, then the browser, in accordance with the present invention, will proceed to download the file from the server. If the file has expressly not been selected, then the browser will not download the file. If the file has an extension for which no action has been specified, the browser will prompt the user to make a yes or no preselection.

Figure 3:
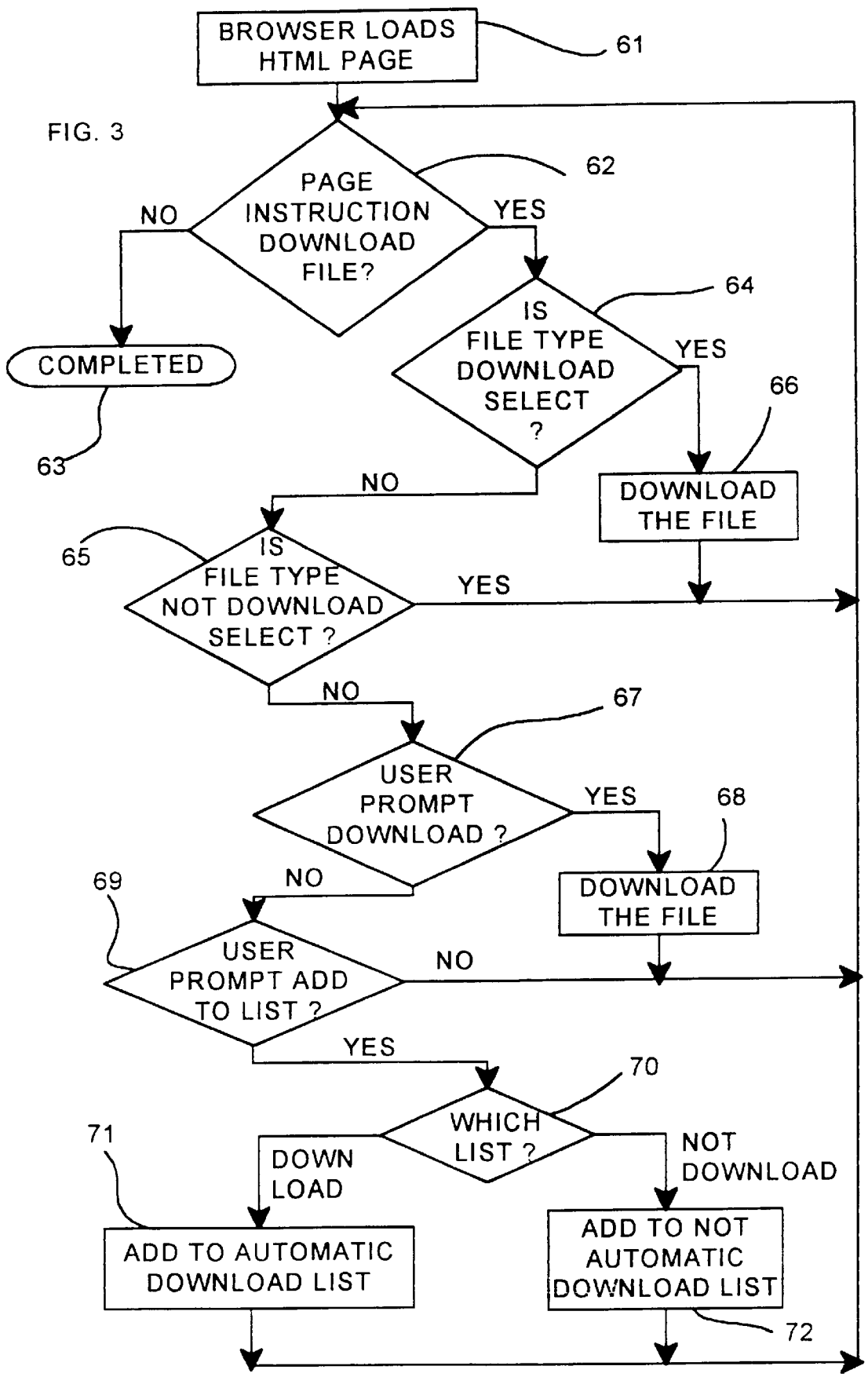
FIG. 3 is a flowchart of an example embodiment of how the invention could be implemented on a browser program operating as previously described on a display station connected to a network.

Now with respect to FIG. 3, there will be described through the flowchart how the present invention may be practiced on a display station browser program. First, step 61, the browser downloads the basic page in HTML into the receiving station, i.e. computer 56 supporting display 57 in FIG. 2. Then, decision step 62, FIG. 3, the system determines whether there is a next file to be downloaded with the basic page. Of course, if this is the first iteration, then it would be the first file. If there is no next file, then the downloading is complete, step 63. If there is a next file, then there is a determination made, decision step 64, as to whether this next file is of the file type which the user has preselected to be downloaded. If yes, then the file is downloaded, step 66. If no, then, step 65, a decision is made as to whether this next file is of the file type which the user has preselected not to be downloaded. If yes, then the file is not downloaded and after this and the above preselection to download the file type, the flow is returned to decision step 62 to deal with the next file. On the other hand, if the file is of a type which has neither been selected for downloading nor not downloading, then, step 67, the user is interactively prompted to decide whether he wishes to download the file. If yes, then the file is downloaded, step 68, and the flow is returned to decision step 62. If the decision by the user is no, then, decision step 69, the user is prompted as to whether he wishes to add the file type to either of his download or not download preselection list. If the user does not wish to add the file type to either list, then the flow is again returned to step 62. If the user wishes to update either one of his preselected lists to include the file type, then, step 70, a determination is made as to which list. If it is download, then step 71, the file type is added to the preselected download list. If it is not downloaded, then step 72, the file type is added to the preselected not download list. Then in either case, the flow is returned to decision step 62 where a determination is made as to whether there is a next file accompanying the page. If no, then we have processed the last file and the downloading procedure is completed, step 63. If yes, then the flow moves to decision block 64 and the process continues as described hereinabove.

It is also within the procedure of this invention to make available to a user through his browser a listing of the files accompanying a page that have been rejected from downloading because they were of file types not to be downloaded. The user may select other files from this group or he may even decide to add a particular file type to his download list as a result of reviewing this list of files rejected from downloading.

Although certain preferred embodiments have been shown and described, it will be understood that many changes and modifications may be made therein without departing from the scope and intent of the appended claims.

What is claimed is:

1. In a computer managed communication network with user access via a plurality of data processor controlled interactive display stations and with a system for displaying documents transmitted to said display stations from locations remote from said stations, said documents including a sequence of at least one display screen page with associated displayable image and media files, the improvement comprising:

user interactive means for preselecting documinent file types not to be transmitted to a receiving display station, user interactive means for preselecting document file types to be transmitted to said receiving display station, said file types being identified by file extensions, and said user interactive means for preselecting said file types to be transmitted and not to be transmitted designate said file types by their respective file extensions, and means for permitting the transmission of only the file types preselected to be transmitted.

2. The communications network of claim 1 wherein said documents are hypertext documents.

3. The communications network of claim 2 wherein said means for selecting file types to be transmitted and means for selecting file types not to be transmitted are located at said receiving display station.

4. The communications network of claim 3, further including at least one network server having means for fetching said documents from said network and transmitting said fetched documents to said receiving station, and said means for permitting the transmission of only the file types preselected to be transmitted.

5. The communications network of claim 4, further including means for transmitting to said receiving station a list of document files not permitted to be transmitted to said receiving station, and interactive means at said receiving station for selecting additional file types to be transmitted to said receiving station in response to the receiving of said list of files.

6. In a computer managed communication network with user access via a plurality of data processor controlled interactive display stations and with a system for displaying documents transmitted to said display stations from locations remote from said stations, said documents including a sequence of at least one display screen page with associated displayable image and media files, a method for reducing document downloading time at a document receiving display station comprising:

interactively preselecting document file types not to be transmitted to said receiving display station, interactively preselecting document file types to be transmitted to said receiving display station, said file types being identified by file extensions and said interactive preselecting of said file types to be transmitted and not to be transmitted designates said file types by their respective file extensions, and permitting the transmission of only the file types preselected to be transmitted.

7. The method of claim 6 wherein said documents are hypertext documents.

8. The method of claim 7 wherein said steps of selecting file types to be transmitted and of selecting file types not to be transmitted are carried out at said receiving display station.

9. The method of claim 8, further including at least one network server on which are carried out the steps of fetching said documents from said network and transmitting said fetched documents to said receiving station, and said step of permitting the transmission of only the file types preselected to be transmitted.

10. The method of claim 9, further including the step of transmitting to said receiving station a list of document files not permitted to be transmitted to said receiving station, and interactively selecting at said receiving station additional file types to be transmitted to said receiving station in response to the receiving of said list of files.

11. In a computer program having data structures included on a computer readable medium for browsing a computer managed communication network via a data processor controlled user interactive receiving display station in order to display on said receiving display station, documents including a sequence of at least one display screen page with associated displayable image and media files transmitted to said station from network locations remote from said receiving station, the improvement comprising:

user interactive means for preselecting document file types not to be transmitted to a receiving display station, user interactive means for preselecting document file types to be transmitted to said receiving display station, said file types being identified by file extensions, and said user interactive means for preselecting said file types to be transmitted and not to be transmitted designate said file types by their respective file extensions, and means for permitting the transmission of only the file types preselected to be transmitted.

12. The computer program according to claim 11 wherein said documents are hypertext documents.

13. The computer program according to claim 12 wherein said means for selecting file types to be transmitted and means for selecting file types not to be transmitted are located at said receiving display station.

14. The computer program according to claim 13, further including means for obtaining and transmitting to said receiving station a list of document files not permitted to be transmitted to said receiving station, and interactive means at said receiving station for selecting additional file types to be transmitted to said receiving station in response to the receiving of said list of files.

\* \* \* \* \*

UNITED STATES PATENT AND TRADEMARK OFFICE
CERTIFICATE OF CORRECTION

PATENT NO : 6,098,102
DATED : August 1, 2000
INVENTOR(S) : Nielsen, et al.

It is certified that error appears in the above-identified patent and that said Letters Patent are hereby corrected as shown below:

Column 6, line 36: delete "docuuminent" and substitute therefor --document--.

Signed and Sealed this

Twenty-fourth Day of April, 2001

Attest:

NICHOLAS P. GODICI

Attesting Officer

Acting Director of the United States Patent and Trademark Office